Patented Sept. 4, 1923.

1,466,983

UNITED STATES PATENT OFFICE.

EDWIN O. BARSTOW AND PAUL COTTRINGER, OF MIDLAND, MICHIGAN, ASSIGNORS TO THE DOW CHEMICAL COMPANY, OF MIDLAND, MICHIGAN, A CORPORATION OF MICHIGAN.

INSECTICIDE AND METHOD OF MAKING SAME.

No Drawing.   Application filed September 1, 1920.   Serial No. 407,449.

*To all whom it may concern:*

Be it known that we, EDWIN O. BARSTOW and PAUL COTTRINGER, citizens of the United States, and residents of Midland, county of Midland, and State of Michigan, have jointly invented a new and useful Improvement in Insecticides and Methods of Making Same, of which the following is a specification, the principle of the invention being herein explained and the best mode in which we have contemplated applying that principle, so as to distinguish it from other inventions.

The present improvement relating as indicated to insecticides has regard more particularly to the manufacture of magnesium arsenate or arsenates that will be suitable for insecticidal use. Certain of the advantages adhering in magnesium arsenate as an insecticide as well as one method of making same, will be found in U. S. Patent No. 1,344,018, issued to Edwin O. Barstow (one of the present inventors) under date of June 22nd, 1920.

It has been found, however, in practice that magnesium arsenate when made by directly reacting between magnesium hydroxide $Mg(OH)_2$, and arsenic acid is apt to contain more arsenic in soluble form than is desirable. As a result of further investigation we have accordingly discovered a modified method of manufacture whereby magnesium arsenate may be prepared so as to be substantially free from soluble arsenic. The product thus obtained would appear to differ in essential and important particulars from any known form of magnesium arsenate and irrespective of its precise molecular constitution may, we believe, be defined with sufficient accuracy to be protected as a part of our invention.

Such invention accordingly consists of the steps and the novel product hereinafter described, it being understood, however, particularly as to such stated method of manufacture, that changes may be made therein without departing from the spirit of the invention, as also that such product need not necessarily be made by the particular method or methods described herein.

As one illustrative example of the present improved method of manufacture, a mixture of magnesium hydroxide ($MgOH_2$) and water containing about six pounds of magnesium hydroxide per cubic foot is put into a mixing tank and to this is slowly added sufficient arsenic acid solution ($H_3AsO_4$) to combine with such hydroxide and give the desired strength of arsenic oxide ($As_2O_5$) in the final product. It is not necessary to use any particular strength of magnesium hydroxide or arsenic acid. Usually sufficient arsenic acid is added to give a finished product containing 33% of the arsenic oxide but the product may run as high as 40% or even 60% in such oxide. After adding the acid to the mixture of hydroxide and water a sample is taken, filtered, dried and analyzed, and then if the precentage is not as desired, either more magnesium hydroxide or more arsenic acid is added and this is repeated until the proper analysis is secured.

The mixture resulting from the foregoing step and preferably containing approximately twelve pounds solid per cubic foot of precipitated magnesium arsenate and residual hydroxide is then pumped into an autoclave, there agitated, and heated while under pressure at a temperature preferably from 165 to 175° C. for a number of hours. For operation at the range of temperature just stated, four hours is sufficient, but if a lower temperature be used, for example, 145° C., a somewhat longer time will have to be allowed for the transformation that attends this stage in the operation. Following the treatment just described, the mixture is then removed from the autoclave, and allowed to settle, following which it is either filter pressed, dried and ground in a disintegrating type of mill, or after such settling it is fed to an atmospheric drum dryer, where the excess of water is evaporated, giving a dry powder suitable for use as an insecticide.

The final product obtained as a result of the foregoing consists of a mixture of very fine magnesium arsenate crystals with an excess of magnesium hydroxide present. While the precise composition of such arsenate has not been satisfactorily determined, we have investigated its properties sufficiently to be convinced that it is essentially different from any known form of magnesium arsenate and particularly from that obtained in accordance with the aforesaid Patent No. 1,344,018.

The only magnesium arsenate described in the literature at all fully has a formula $MgHAsO_4.6$—1—$2H_2O$ (see Abegg's "Handbuch der Anorganischen Chemie, III," page 541, 1907). Apparently this is the compound obtained by the patented process except as modified in its properties by the presence of excess hydroxide. It occurs in very large flat, plate-like crystals, and shows when tested for solubility by the usual method, from 1.5 to 3% of soluble arsenic oxide ($As_2O_5$).

The method of testing arsenates for solubility regularly used is that officially prescribed by the Government, in which two grams of arsenate are suspended in one liter of pure distilled water and agitated frequently for twenty-four hours, the arsenic in the solution being determined after filtration. It has also been usual to test arsenates as to solubility of arsenic content in carbon dioxide. According to this test, the arsenate is suspended in water in the proportion of two grams per liter and carbon dioxide then passed through. When subjected to this test the old magnesium arsenate will go into solution completely in about an hour's time. In other words, with a standard product containing about 33% arsenic oxide, 33% of soluble arsenic will be found after treatment for test. As compared with the foregoing results in the testing of such old magnesium arsenate, the product obtained by the present method when tested for solubility in water invariably shows less than 0.75% of soluble arsenic and frequently only a mere trace of the latter is found. More strikingly, when subjected to the second test, viz: for solubility of arsenic content in carbon dioxide, 9% represents the maximum solubility of our new product containing originally 33% of soluble arsenic.

In the present new product the magnesium arsenate is present in one or all of three distinct crystalline forms. This crystalline material may or may not be mixed with excess magnesium hydroxide, depending upon the composition of the sample. Of the three forms that have been identified the one occurs as exceedingly small, rather lens-shaped crystals, having parallel extinction and a negative principal zone, the indices of refraction being as follows, viz: alpha 1.64 and gamma 1.66. The probable formula for this form is $MgHAsO_4.xH_2O$, in which the value of $x$ has not been definitely determined as yet. A second form occurs either as long, needle-shaped crystals, elongated, pointed-ended crystals, or short, flat-ended prisms, having parallel extinction and a positive principal zone, the indices of refraction being as follows, viz: alpha 1.58 and gamma 1.605. The probable formula for this form is $Mg_3(AsO_4)_2.MgO.yH_2O$, in which the value of $y$ has not yet been definitely determined. The third form is probably represented by the formula $Mg_3(AsO_4)_2.2MgO.zH_2O$, in which the value of $z$ has not yet been definitely determined. This form occurs as exceedingly small, lens-shaped crystals, having parallel extinction and a positive principal zone, the indices of refraction being as follows, viz: alpha 1.565 and gamma 1.575.

In addition to the magnesium arsenate hereinbefore referred to as described in the literature, viz: the acid arsenate with 6½ molecules of water, a second form of such arsenate has been identified as occurring in the mineral Hoernesite having the formula $Mg_3(AsO_4)_2.8H_2O$. We have definitely established that the arsenates occurring in the present new compound contain much less than this amount of crystal water. Magnesium pyro-arsenate with the formula $Mg_2As_2O_7$ is also described in the literature and has been prepared, but this compound possesses no definite crystalline structure and shows a soluble arsenic content, when tested by the usual method, of more than 5%.

In view of the foregoing it is believed that the compounds occurring in the new magnesium arsenate obtained by the process hereinbefore described have never before been made or described. Indications of the presence of one or two compounds in addition to those described above have been obtained in certain samples of the new material but one or the other of the three products noted above apparently make up the bulk of the product.

As an indication of the variations that may be made in the specific illustrative process described, it should be stated that the admixture of the arsenic acid to the suspended magnesium hydroxide may, if found desirable, take place in the autoclave, thus combining both steps of the described process in one. Furthermore, the magnesium hydroxide, suspended in a slurry, may be added to the acid, either as separately in advance to the autoclave step, or, as just indicated, such addition may take place in the autoclave at once.

It will also be understood that magnesium oxide (MgO) may be substituted for magnesium hydroxide in any of the foregoing methods of preparation, as also that the arsenate may be formed by a so-called decomposition, i. e. by the reaction of a soluble arsenate with a soluble magnesium salt. Thus sodium arsenate and magnesium chloride may be caused to react in accordance with the following equation, viz:

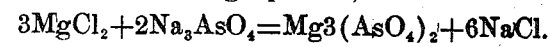
$3MgCl_2 + 2Na_3AsO_4 = Mg_3(AsO_4)_2 + 6NaCl.$

The autoclaving, just as before, may be carried out incidentally to the reaction or subsequently thereto i. e. after the precipitate of magnesium arsenate has been formed. We have also found it possible to obtain satisfactory results by utilizing a waste product which contains arsenic acid and sodium arsenate, adding thereto magnesium hydroxide to combine with such arsenic acid and magnesium chloride to react with the sodium arsenate, then washing to remove the sodium chloride formed, and heating the resulting product in an autoclave under pressure, there being preferably an excess of magnesium hydroxide present.

Other forms may be employed embodying the features of our invention instead of the one here explained, change being made in the form or construction, provided the elements stated by any of the following claims, or the equivalent of such stated elements be employed, whether produced by our preferred method or by others embodying steps equivalent to those stated in the following claims.

We therefore particularly point out and distinctly claim as our invention:—

1. In a method of making magnesium arsenate, the steps which consist in causing a reaction between arsenic acid and a magnesium compound capable of forming the arsenate therewith, and subjecting the resulting mixture in an autoclave to a temperature above the boiling point of water.

2. In a method of making magnesium arsenate, the steps which consist in causing a reaction between arsenic acid and a magnesium compound capable of forming the arsenate therewith, and subjecting the resulting mixture in an autoclave to a temperature of from 145° to 175° C.

3. In a method of making magnesium arsenate, the steps which consist in causing a reaction between arsenic acid and a magnesium compound capable of forming the arsenate therewith, and subjecting the resulting mixture in an autoclave to a temperature above the boiling point of water while under a pressure greater than atmospheric.

4. In a method of making magnesium arsenate, the steps which consist in causing a reaction between arsenic acid and magnesium hydroxide, and subjecting the resulting mixture in an autoclave to a temperature above the boiling point of water.

5. In a method of making magnesium arsenate, the steps which consist in causing a reaction between arsenic acid and magnesium hydroxide, and subjecting the resulting mixture in an autoclave to a temperature of from 145° to 175° C.

6. In a method of making magnesium arsenate, the steps which consist in causing a reaction between arsenic acid and magnesium hydroxide, and subjecting the resulting mixture in an autoclave to a temperature above the boiling point of water while under a pressure greater than atmospheric.

7. In a method of making magnesium arsenate, the steps which consist in adding a solution of arsenic acid to magnesium hydroxide suspended in water, and heating the resulting mixture under pressure.

8. In a method of making magnesium arsenate, the steps which consist in adding a solution of arsenic acid to an excess of magnesium hydroxide suspended in water, heating the resulting mixture under pressure, separating and drying the solid material then remaining, and pulverizing the same.

9. As a new product, a compound suitable for insecticidal use containing magnesium arsenate in highly insoluble form, less than 1.00% soluble arsenic being found in a sample suspended in water and agitated for a period of twenty four hours.

10. As a new product, a compound suitable for insecticidal use containing magnesium arsenate in highly insoluble form, not more than 0.75% soluble arsenic being found in a sample suspended in water and agitated for a period of twenty four hours.

11. As a new product, a compound suitable for insecticidal use containing magnesium arsenate in highly insoluble crystalline form, the crystals being exceedingly small and having parallel extinction and either a negative or positive principal zone.

12. As a new product, a compound suitable for insecticidal use containing magnesium arsenate in highly insoluble crystalline form, the crystals being exceedingly small and lens-shaped, and having parallel extinction and either a negative or positive principal zone.

13. As a new product, a compound suitable for insecticidal use containing magnesium arsenate in highly insoluble crystalline form, the crystals being exceedingly small and having indices of refraction lying between the following limits, viz: alpha 1.56 to 1.64 and gamma 1.57 to 1.60.

14. As a new product, a form of magnesium arsenate having the general formula $MgHAsO_4 \cdot xH_2O$, occurring as exceedingly small, rather lens-shaped crystals having parallel extinction and a negative principal zone, the indices of refraction being as follows, viz: alpha 1.64 and gamma 1.66.

Signed by us at Midland, Mich., this 25th day of August, 1920.

EDWIN O. BARSTOW.
PAUL COTTRINGER.